United States Patent [19]
Young et al.

[11] 4,164,785
[45] Aug. 14, 1979

[54] MULTIPHASE TO SINGLE PHASE AND FREQUENCY CONVERTER SYSTEM

[75] Inventors: Thomas A. Young, Burton; Jay W. Gustin, Mantua, both of Ohio

[73] Assignee: Tenna Power Corporation, Cleveland, Ohio

[21] Appl. No.: 858,888

[22] Filed: Dec. 8, 1977

Related U.S. Application Data

[63] Continuation of Ser. No. 726,918, Sep. 27, 1976, abandoned.

[51] Int. Cl.² .................... H02H 7/10; H02P 9/10; H02P 7/66
[52] U.S. Cl. ..................... 363/50; 363/37; 318/158; 322/69; 361/20
[58] Field of Search ............... 363/9, 10, 34, 36, 37, 363/41, 43, 55, 56, 57, 58; 361/20, 21; 322/37, 59

[56] References Cited

U.S. PATENT DOCUMENTS

| 2,736,857 | 2/1956 | Klug | 322/69 |
|---|---|---|---|
| 3,351,812 | 11/1967 | Cutler et al. | 322/69 X |
| 3,393,348 | 7/1968 | Porterfield et al. | 361/20 X |
| 3,532,949 | 10/1970 | Williams et al. | 363/109 X |
| 3,727,122 | 4/1973 | Hughes et al. | 363/37 |

FOREIGN PATENT DOCUMENTS

958924 9/1949 France.
1127540 8/1956 France.

Primary Examiner—William M. Shoop
Assistant Examiner—Peter S. Wong
Attorney, Agent, or Firm—Watts, Hoffmann, Fisher & Heinke Co.

[57] ABSTRACT

A multiphase to single phase electrical energy converter wherein the frequency is converted from a relatively high frequency, in order of 1,000 hertz, to a relatively low frequency, as for example, normal household frequency of 60 hertz. A three-phase alternator is driven by an internal combustion engine, the output of the alternator being fed to a full-wave bridge circuit and finally to an inverter. The output of the bridge circuit is acted on by a resolver. The resolver is utilized to control the delivery of energy from the alternator to the inverter to provide an average current or power to the inverter which increases and decreases in a unipolar sinusoidal form at a frequency which is twice the desired output frequency. The inverter is utilized to invert every other cycle of the output from the resolver. Thus, the power from the inverter will take the form of an alternating sinusoidal waveform at 60 hertz. An arc suppressor circuit is provided to protect the resolver and inverter from arcing during switching for non-resistive loads. A current detector circuit senses the inductive ring current at the load and protects the alternator from application of improper loads and a thermal breaker protects the alternator from load faults.

31 Claims, 7 Drawing Figures

MULTIPHASE TO SINGLE PHASE AND FREQUENCY CONVERTER SYSTEM

This is a continuation of application Ser. No. 726,918 filed Sept. 27, 1976, now abandoned.

BACKGROUND AND SUMMARY OF THE DEVELOPMENT

This invention relates generally to an energy conversion system and, more specifically, to an energy conversion system which is capable of converting three-phase high frequency energy to single phase, relatively low frequency energy as, for example, 60 cycle energy, and is an improvement on the system shown in copending patent application to Young et al, Ser. No. 542,249, filed Jan. 22, 1975, the disclosure of which is herein incorporated by reference.

With the increased use of electrical energy in remote areas, a great demand has arisen for portable or emergency energy sources of electric power. Typically, these sources of electrical power are utilized to drive appliances and the like which are designed to efficiently operate at 60 hertz alternating power. Accordingly, there is a need for a relatively low cost, portable source of alternating current, 60 hertz energy.

A common means of generating alternating current energy is by a generator driven by a prime mover. It has long been known that the size, and therefore the expense, of building a generator to produce a preselected power output decreases as the frequency increases. One problem is that the standard in the industry has become 60 hertz in the United States, and in many other countries of the world, and hence the use of high frequency generators is not practical for many applications.

With the present invention a means is provided of utilizing a high frequency generator incorporating highly developed prime mover and generator components presently available on the market to produce a low frequency output.

This is accomplished by utilizing a conventionally available prime mover which, for example, can via belt drive etc., have a 9,600 rpm output to drive a high speed, three-phase, multipole, for example 12 to 16 poles, alternator of conventional design. Alternators of this type have been employed in electrical systems in the automotive industry for a number of years.

In one form of the invention, the prime mover is operated to rotate the field windings of a twelve pole alternator at 9,600 rpm which is adapted to generate a 960 hertz output from a polyphase wye connected armature winding. The output of the three-phase armature winding is approximately equal to the desired peak voltage of the sinusoid waveform that the system reconstructs at the output. This output voltage is approximately 160 volts peak. For purposes of this specification, the use of the term hertz is intended to include a repetitive waveform, whether alternating or unipolar.

The output of the three-phase 960 hertz alternator is fed to a full wave rectifier bridge through a resolver device which is utilized to control the output from the bridge in synchronism with the operation of alternator via the prime mover to provide a modulated wave approximating a sinusoidal shape.

Subsequently, the switching of the power output from the resolver is accomplished by the inverter device and occurs twice per output cycle. The inverter is devised and synchronized to perform its switching function at a point when the output voltage is zero. Where the load is resistive the current and voltage will be in phase and switching at zero volts will provide switching at zero current as well. However, where inductive or low power factor loads are encountered the current at zero volts could be substantial and could result in arcing at the switches of the resolver and/or inverter. This problem is solved by an arc suppressor circuit which is actuated prior to opening of the load circuit to provide a shunt path around the switch which permits switching without damaging arcing.

The prime mover is, in one form of the invention, adapted to drive alternator 12 at 9,600 rpm. The resolver and inverter devices are interconnected and are driven in turn by a gear reduction system whereby the resolver and inverter devices rotate at a speed which is one-half the speed of the prime mover or 3,600 rpm. In this way, the resolver provides a modulated pulsating direct voltage output at 120 hertz; the inverter operates to invert alternate cycles from the resolver to provide an output therefrom to the load at 60 hertz.

As will be seen from a further description of the system, the output from the inverter is not, in the voltage sense, a sinusoidal waveform. Rather, the output is approximately at a constant voltage, for example 160 volts. However, the average output generated at the output terminals of the inverter varies as a 60 hertz sinusoidal wave. In the preferred embodiment, this is accomplished by the resolver in first switching in the first phase from the alternator (as rectified) to provide a short duration pulse of 160 volt amplitude. Subsequently, a second phase (as rectified) is switched in to add to the output energy from the first phase. Subsequently, the third phase from the alternator (as rectified) is switched in whereby all three phases are conducting and energy is flowing from the output inverter substantially continuously.

The situation then reverses whereby the first phase is switched out and the second and third phases provide approximately two-thirds of the full load average current, and next the second phase is out leaving only the third phase conductive. At the end of the cycle, all three phases are switched out and the inverter switches the subsequent waveform to the opposite polarity and presents this inverter waveform at its output. It is at the switching off of the third phase that the arc suppressor circuit noted above is operative. From the foregoing, it is seen that each phase provides approximately an equal amount of output current relative to the other phases. Thus, no one phase provides substantially more energy than any other phase in the system.

In addition to the above the present invention provides means to protect the alternator from improper loads by sensing excessive voltage rises at the output and shutting down the alternator in response.

Further, the system provides means to protect the alternator from load faults and to shut the alternator down in response thereto.

Accordingly, it is one object of the present invention to provide an improved prime mover and generator set for generating alternating current low frequency energy.

It is another object of the present invention to provide an improved prime mover and generator set wherein the generator operates at a high frequency and the high frequency energy is converted to a relatively low frequency.

It is another object of the present invention to provide an improved prime mover and generator set wherein the output of the generator is converted to an average current having a waveform substantially sinusoidal in shape.

It is still a further object of the present invention to provide an improved energy conversion system which utilizes a multiphase, high frequency generator source for generating single phase, low frequency electrical energy.

It is another object of the present invention to provide an improved energy conversion system which converts multiphase, high frequency alternating current energy to single phase, low frequency alternating current energy wherein the power output of the system is a time modulated waveform having a sinusoidal characteristic.

It is another object of the present invention to provide a system of the above described type including arc suppressor circuit means for protecting the switching devices from arcing.

It is another object to provide a system of the above described type providing means for protecting the alternator system from high output voltages resulting from improper loading or the like.

It is still another object to provide a system of the above described type providing means for protecting the alternator from load faults.

Further objects, features and advantages of the present invention will become apparent from a detailed study of the specification and claims, and the attached drawings in which:

Figure 1:
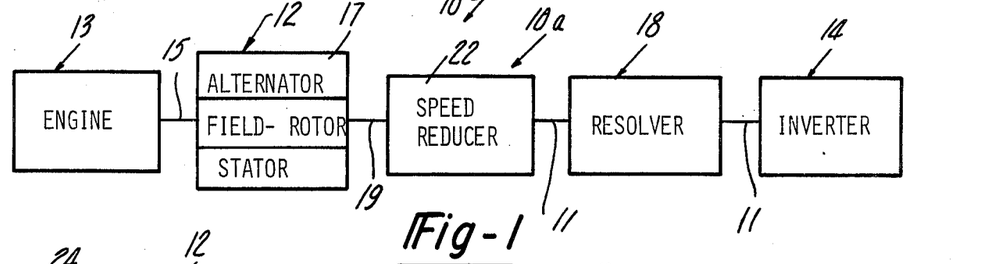
FIG. 1 is a block diagram illustrating the mechanical details of one form of the present invention.
Figure 2:
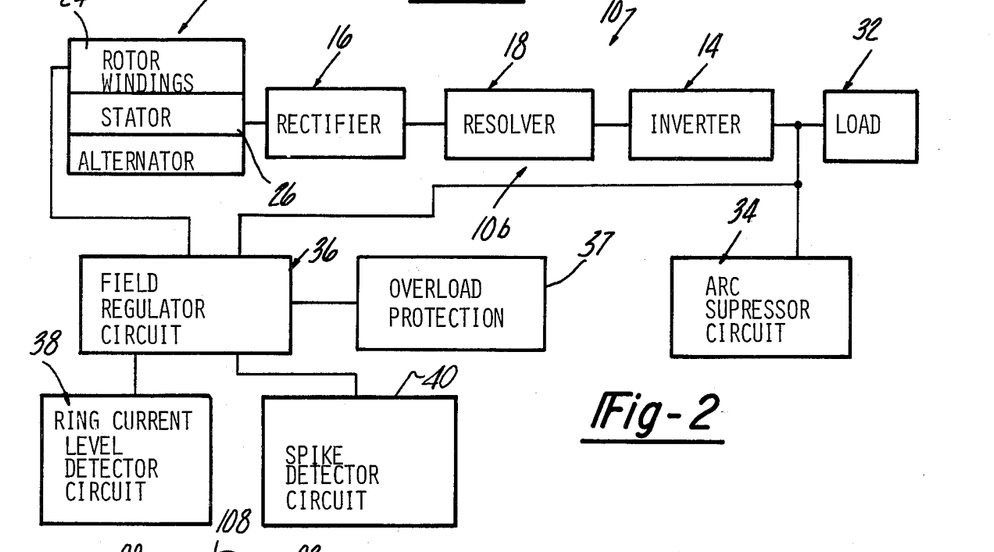
FIG. 2 is a block diagram illustrating the electrical portions of the system.

Referring now to the drawings, and particularly to the details generally illustrated in the schematic and block diagrams of FIGS. 1 and 2 thereof, an energy conversion system 10 is depicted which includes a mechanical drive system 10a and an electrical system 10b having a high frequency multiphase alternating current generator or alternator 12, an output inverter 14 to which the output of the alternator is fed through a full wave rectifier bridge circuit 16 via a resolver unit 18.

Looking to FIG. 1, the alternator 12 is a typical high frequency multiphase alternator such as that utilized in conjunction with an automotive electrical generation system driven by the automobile engine. The alternator 12 has been selected to be of the type which generates a three-phase, 960 hertz output power. The alternator 12 is adapted to be driven by a conventional internal combustion prime mover 13 of the small horsepower type presently available on the market. The prime mover 13 selected in the illustrated example, but not shown, is adapted to run at a selected desired speed and to drive the alternator 12 at 9,600 rpm and has a power output commensurate with the energy which is desired to be generated by the electrical system and, for the most part, is in the five to ten horsepower range.

A prime mover shaft 15 or other coupling is directly coupled to a rotor 17 which carries the field windings of the alternator 12 to rotate the field windings at a substantially constant speed; in the illustrated example the alternator can be turned at 9,600 rpm via a gear or belt drive by a prime mover driven at a desired speed. A shaft 19 from alternator 12 is connected with a speed reducer 22 which is also driven at 9,600 rpm. The resolver 18 and inverter 14 are connected to be driven by an output shaft 11 at the output of speed reducer 22. The gear reducer 22 is adapted to drive the inverter 14 and resolver 18 at a speed less than that of alternator 12. For the system of the present invention, and in view of the 9,600 rpm operating speed of the alternator 12, the gear reducer 22 has been selected to have a desired reduction whereby the inverter 14 and resolver 18 operate at 3,600 rpm. With the commercially available gear reducer selected, and with the alternator 12 being a twelve pole machine, the output voltage of the inverter 14 will be a single phase output at a frequency of 60 hertz.

Looking now to FIG. 2, the three phase alternator 12 has field or rotor windings 24 on rotor 17 and adapted to be rotated therewith and has output or stator windings 26. The output from stator windings 26 is transmitted to rectifier 16 where selective rectification occurs. The rectifier 16 is connected to the resolver 18 which operates with the rectifier 16 to selectively control the number of phases rectified at any one time whereby a modulated output is provided wherein a series of half wave pulses result having a shape which approximates a series of half wave sinusoids. This will be more readily seen from details to be discussed. The modulated wave is then inverted on alternate pulses via inverter 14 whereby an alternating current output will be applied to a load 32.

As will be seen the resolver 18 and inverter 14 define a commutator like structure and hence are mechanical switches, i.e. brush type. It has been found that with resistive loads or low power factor loads where the voltage and current are closely in phase there is no problem of arcing when the circuit is opened during switching. However, with medium to low power factor or inductive loads substantial arcing can occur resulting in damage to the switching components i.e. brushes, etc. This arcing is minimized by an arc suppressor circuit 34.

In addition to the arc suppressor circuit 34, the output of the alternator 12 is regulated by means of a field regulator circuit 36 which senses the output voltage and varies the current to the field windings 24 accordingly.

It is possible under certain extreme inductive load conditions to encounter high output currents at the opening of the last resolver switch. The magnitude of this current can be so high that the arc suppressor circuit 34 could not commutate properly and current would be flowing during subsequent mechanical switching. To prevent damage, this extreme condition is sensed by a ring current detector circuit 38 which acts on the regulator circuit 36 to shut the alternator 12 down. It should be noted that the latter condition would occur only when an improper or excessive load is applied at load 32 which essentially is beyond the expected capacity of alternator 12.

Along the same line as the above, there can also occur an actual fault in load 32 which again could exceed the capacity of alternator 12. In this case a thermal breaker is provided to sense this condition and opens the field circuit to shut the alternator 12 down; this is done by overload protection circuit 37.

In addition there can appear high voltage spikes which are not detected by ring current detector 38; in this case a thermal device is used to sense this condition and operate on the field regulator 36 to shut the alternator 12 down. This is done via a spike detector circuit 40.

Figure 3A:
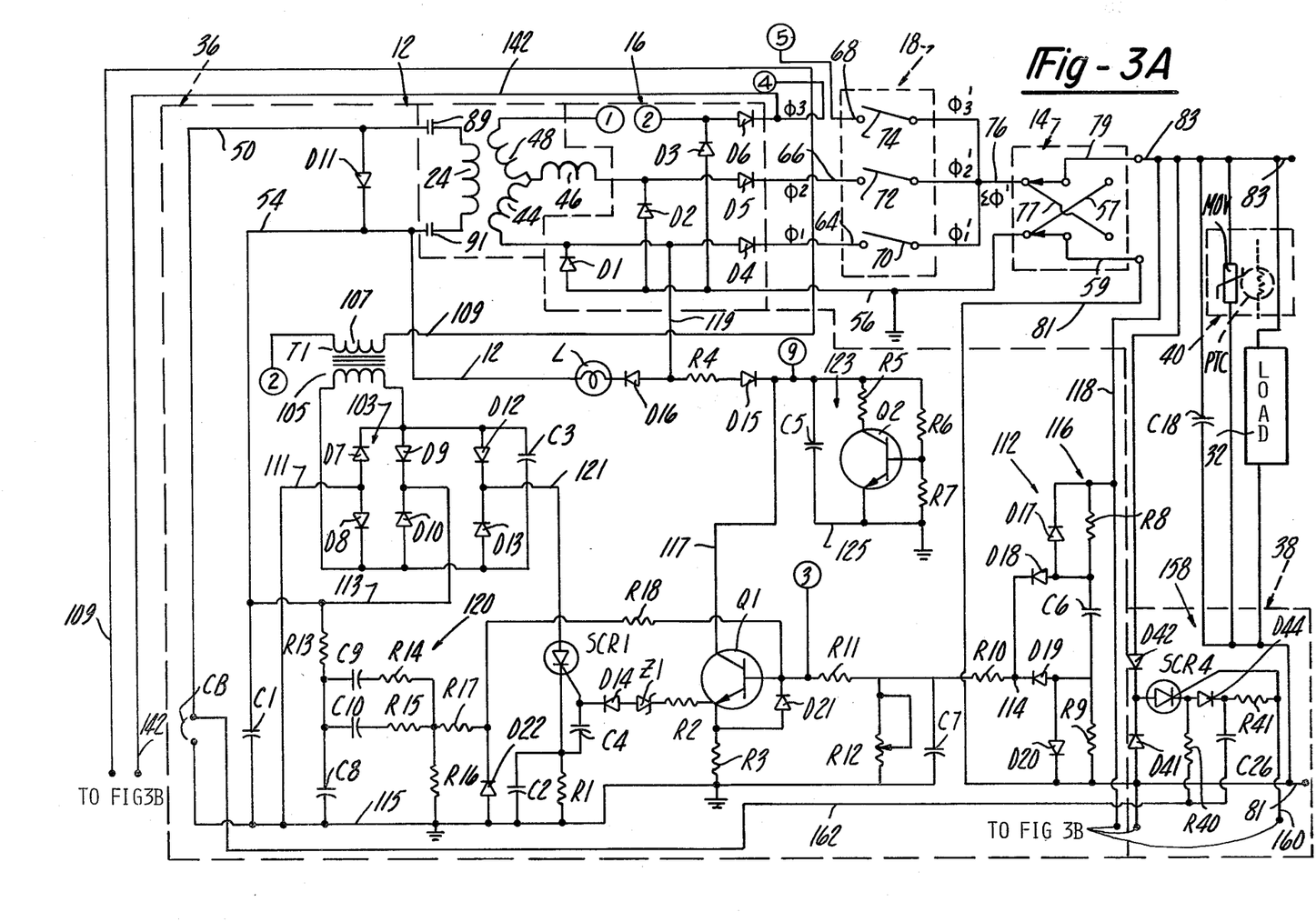
FIGS. 3A and B are electrical circuit diagrams of the electrical portions of the system.
Figure 3B:
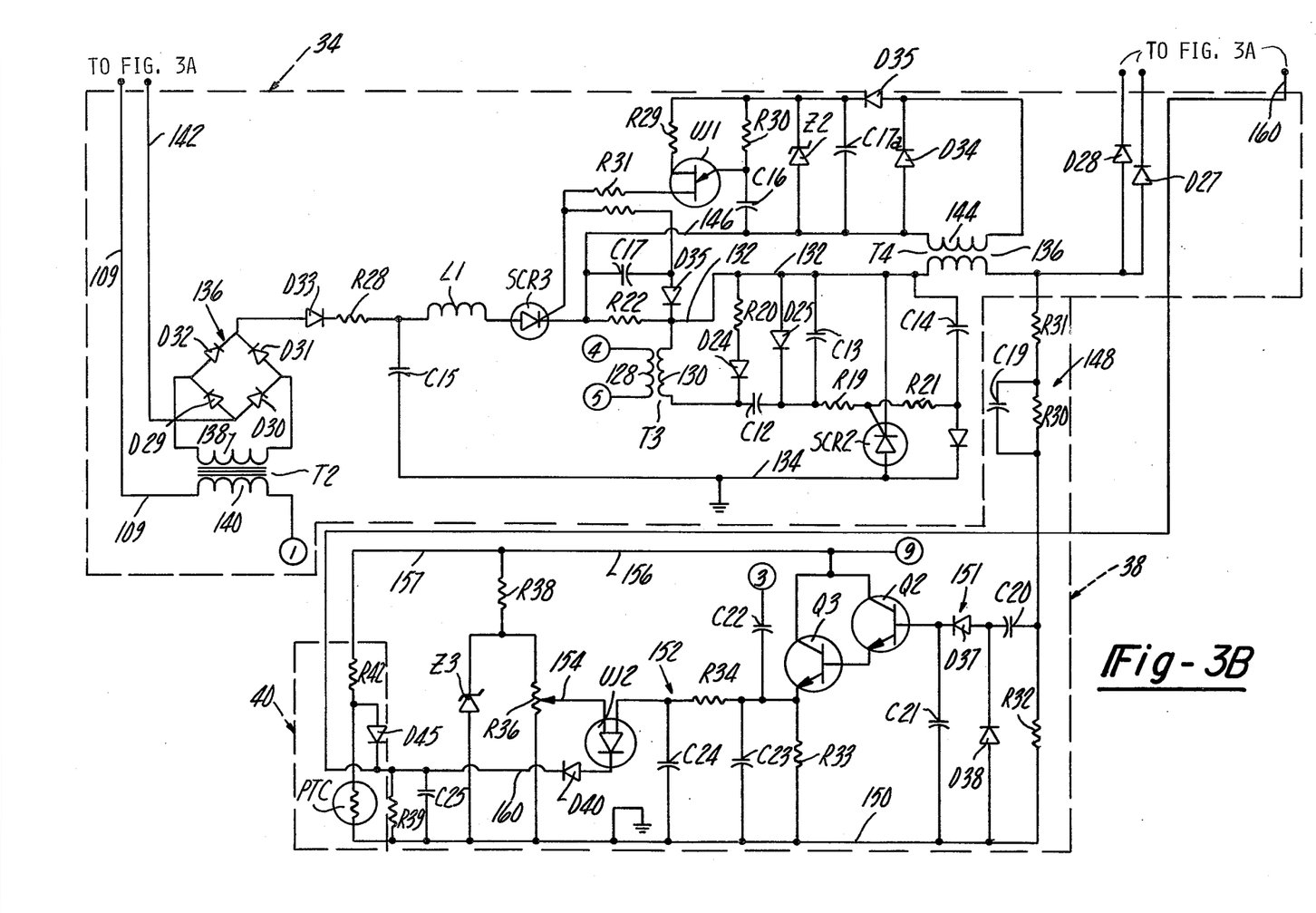

With the above background let us now look to the details of the various particulars of the system 10 as shown in FIGS. 3A and B. Note that in FIGS. 3A and B connection points such as 1 and 2 or 4 and 5 are connected to similarly numbered points whereby the associated circuits are completed.

Referring to the specific details of the alternator 12, it is seen that the alternator 12 includes a plurality of armature windings 44, 46, 48 which are interconnected in a wye configuration without a center tap and represent phases 1 through 3, respectively. The windings 44, 45, 48 are wound on the stator poles in a conventional manner and are magnetically coupled to the field windings 24 which are wound on rotor 17 which is a conventional structure. The field windings 24 are provided with exciting energy from the field regulator circuit 36 by means of a pair of conductors 50, 54.

The output voltages at windings 44, 46, and 48 are connected to the rectifier circuit 16 which comprises a plurality of diodes D1–D6 which are connected as a full wave bridge; however, as will be seen the operation of the bridge 16 is modulated by the resolver 18 to provide the desired output. Diodes D1–D3 have their cathodes connected together to a system ground conductor 56 and have their anodes separately connected to each phase winding 44, 46 and 48, respectively. Diodes D4–D6 have their cathodes separately connected to each phase winding 44, 46 and 48, respectively, and have their anodes connected to conductors 64, 66 and 68, respectively, of switches 58, 60 and 62 respectively at the resolver 18. Resolver 18 is symbolically represented by the switches 58, 60 and 62 which include elements 70, 72, and 74 which cooperate with conductors 64, 66, and 68 respectively, to complete their respective switches with the latter conductors being connected together via conductor 76. The output from resolver 18 will appear across conductors 76 and 56. In a manner to be more readily seen, the resolver 18 modulates the rectified output received via pulse width modulation to provide a wave which when integrated, closely resembles a sinusoidal wave. The output, however, at conductor 76 and 56 would appear as a direct voltage of pulsating half waves. Inversion of alternate half cycles is performed by inverter 14. Inverter 14 is symbolically represented as a double pole double throw switch and includes input contacts 77 and 57 which are electrically connected to conductors 76 and 56, respectively. At the same time a pair of output contacts 79 and 59 are alternately connected between contacts 77 and 57, respectively, and 57 and 77, respectively, on alternate half cycles. The result is that the pulsating direct voltage is now changed to an alternating voltage, with each half cycle having a shape simulating a sinusoidal wave as a result of the pulse modulation referred to above. Contacts 59 and 79 are connected to output conductors 81 and 83, respectively, which are in turn connected to the load 32.

Figure 5:
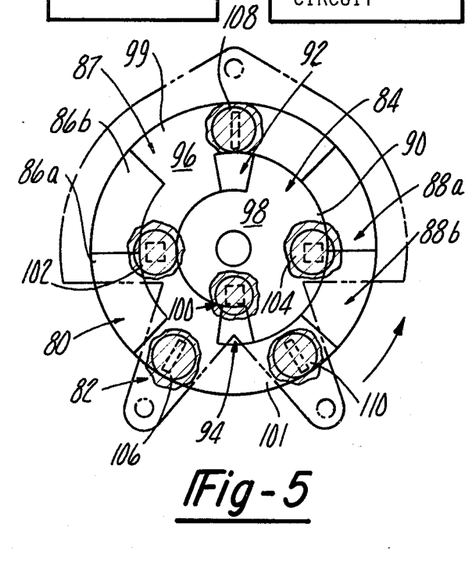
FIG. 5 is a plan view with some parts of the stator shown in phantom and others broken away of the combined resolver and inverter structures of the system.
Figure 6:
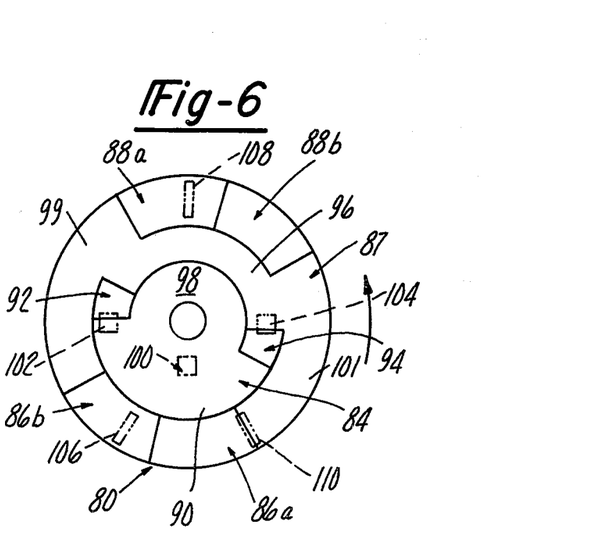
FIG. 6 is a plan view with some parts removed of the combined resolver and inverter structures in a position at which actuation of the arc suppressor circuit of FIGS. 2 and 3A, B occurs.

The switches 58, 60 and 62 symbolically represent the structure of resolver 18 where the switches are actually brush and slip ring constructions as shown in FIGS. 5 and 6. In the same manner contacts 57, 77 and 59, 79 symbolically represent the structure of inverter 14 and are actually brush and slip ring constructions as shown in FIGS. 5 and 6.

Looking now to FIGS. 5 and 6 the resolver 18 and inverter 14 are shown on a common assembly which includes a rotor structure 80 and a stator structure 82. The rotor structure 80 includes a ground segment 84 and a common segment 87. Both are made of conductive materials and are insulated from each other. Rotor structure 80 includes two side-by-side insulating segments 86a and 86b located diametrically opposite two additional side-by-side insulating segments 88a and 88b. The insulating paired segments 86a, 86b and 88a, 88b each define approximately 90° at the outer circumference of the rotor 80, thereby leaving two outer conductive portions 99 and 101 of approximately 90° each of common segment 87.

The ground segment 84 has a radial outer portion 90 which extends arcuately only partially and terminates at opposite ends in diametrically opposed insulating segments 92 and 94. Segments 92 and 94 are of relatively short width circumferentially being generally just sufficient to fully accommodate a brush, in a manner to be seen.

With insulating segments 92 and 94, the outer portion 90 of ground segment 84 extends for slightly less than 180° and likewise of identical extent is a complementary radially inner portion 96 of the common segment 87. The ground segment 84 has a continuous center portion 98 located radially inwardly from outer portion 90.

The stator structure 82 has a ground brush 100 located to electrically contact the center portion 98 of ground segment 84. A pair of inverter brushes 102 and 104 are diametrically oppositely located on stator structure 82 in radial positions to electrically contact the inner portion 96 of common segment 87, and of the insulating segments 92 and 94 and outer portion 90 of segment 84. Three separate brushes 106, 108, and 110 are located to be in electrical contact with outer portions 99 and 101 of common segment 87 and with insulating segments 86a, b and 88a, b. In essence then brushes 102 and 104 correspond to contacts 59 and 79, respectively, of inverter 14 while segment portions 90 and 96 correspond to contacts 57 and 77, respectively, of inverter 14.

With regard to brushes 106, 108, and 110 these correspond to conductors 64, 66, and 68, respectively, of resolver 18 while segment portions 99 and 101 and insulation segments 86a, b and 88a, b correspond to switch portions 70, 72 and 74 of resolver 18. Note in this regard, that the common electrical circuit of outer portions 99 and 101 of common segment 67 with inner portion 96 of segment 87 defines the conductor 76. The brushes 106 and 110 are located sixty mechanical degrees (60°) from each other and each are located one hundred and fifty mechanical degrees (150°) from brush 108. It will be seen, however, that brush 108 functions electrically the same as if it were located in between brushes 106 and 110 and hence brush 106 is effectively thirty (30°) degrees from brush 108 which in turn is thirty (30°) degrees from brush 110.

Figure 4:
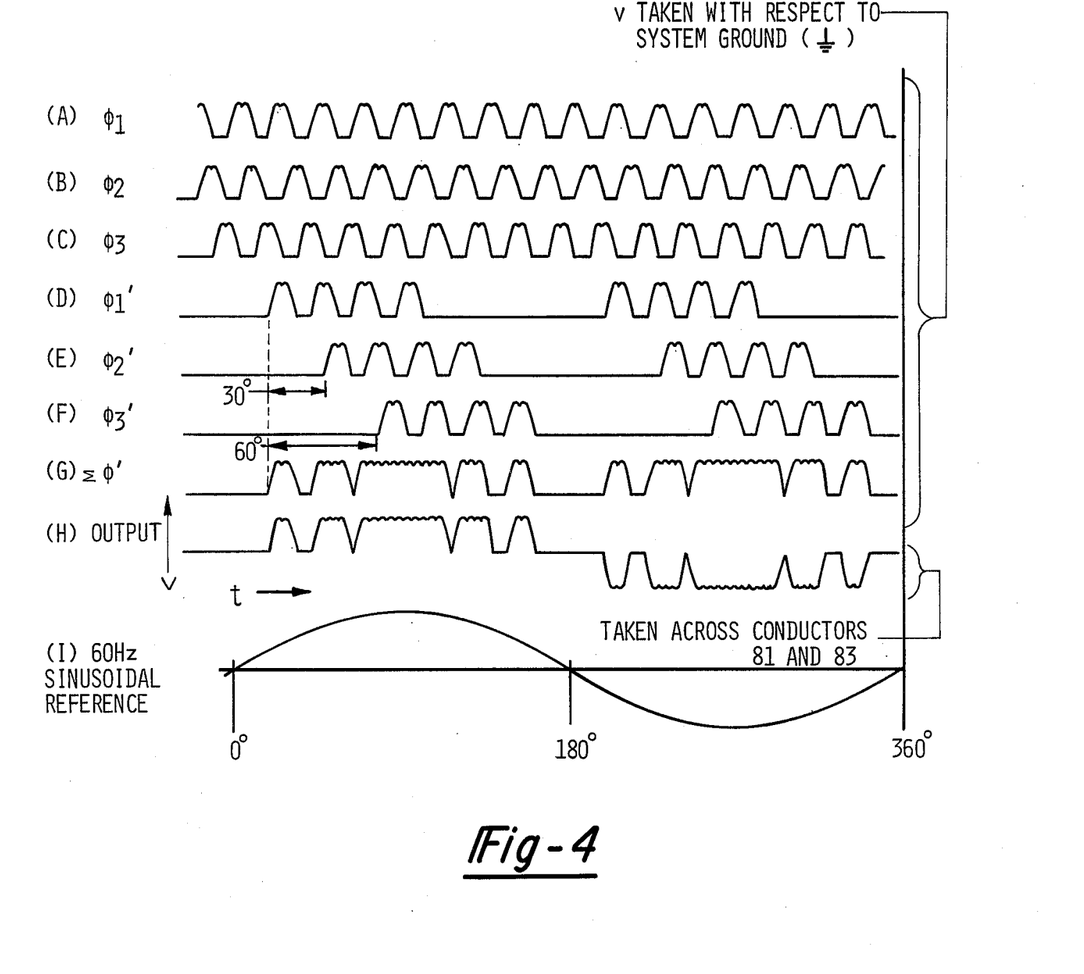
FIG. 4 is a voltage versus time waveform diagram illustrating the relationship of the voltages generated, rectified, resolved and inverted.

Assuming that the rotor structure 80 rotates counter-clockwise the various voltage waveforms of curves (A) through (H) shown in FIG. 4 will result. Thus curves (A)–(C) depict the rectified phase voltages at each phase ($\phi_1$ to $\phi_3$) with respect to ground i.e. at contacts 64, 66, and 68. Curves (D)-(F) depict the modified output ($\phi_1'$ to $\phi_3'$) of each phase at the output of the resolver 18. It can be seen that each phase has alternate "on" times and "off" times for approximately ninety (90°) degrees each. This is provided by the ninety (90°) degree insulating segments 86a, b and 88a, b which alternate with the conducting sections 99 and 101 of common segment 87. As noted, the brushes 106, 108 and 110 are located effectively thirty (30°) degrees apart. Thus as shown in curves (D)-(F) the $\phi_1'$ voltage will be switched in first; thirty degrees (30°) later than the $\phi_2'$ voltage will be switched in; and sixty degrees (60°) later than the $\phi_3'$ voltage will be switched in. The interruption of modified phase voltages $\phi_1'$–$\phi_3'$ will occur on the same order, i.e. with the $\phi_3'$ voltage being opened last. The modified phase voltages $\phi_1'$–$\phi_3'$ are summed as seen in curve (G) and will result in the pulse width modulated wave shown. Upon inversion of alternate half cycles via the inverter 14 the output wave shape will be as shown in curve (H). The integrated result of the wave shape of curve (H) closely resembles the sinusoidal wave shown in curve (I). Thus the resolver 18 in combination with the rectifier 16 can be considered as a controlled rectifier since the resolver switches to control the rectification through rectifier 16.

The gear reducer 22 is selected to reduce the rpm of the resolver 18 and inverter 14 from 9,600 rpm to 3,600 rpm. Since alternator 12 is a twelve pole machine, the result will be the conversion of the 960 Hz generated three phase a-c voltage at windings 44-48 to a single phase 60 Hz a-c output voltage.

With the above in mind, let us now look to the field regulator circuit 36. As noted the field regulator circuit 36 is electrically connected to the field windings 24 via conductors 50 and 54; since the field 24 is on the rotor of alternator 12 the electrical connection is made via conventional brush and slip ring assemblies 89 and 91.

Direct current potential is provided for the field 24 by a full wave bridge 103 which is comprised of conventionally connected diodes D7-D10. The input of bridge 103 is connected to the secondary winding 105 of a current transformer T1 which has its primary 107 serially connected in the phase three leg 48 between connection points 1 and 2. Note that one end of the primary winding 107 is connected to the point 2 connection while the other end is connected to the point 1 connection via the primary winding of a booster transformer T2 via conductor 109 (see interconnection to FIG. 3B).

The output from the bridge 103 is taken via conductors 111 and 113, with conductor 111 being connected to conductor 50 and brush and slip ring 89 via a thermal circuit breaker CB and with conductor 113 being connected to conductor 54 and brush and slip ring 86. The thermal circuit breaker CB is normally closed and is of a manually resettable type, i.e. not self resetting. Breaker CB is connected to a system ground conductor 115 whereby one end of the field winding 24 and of the output circuit of bridge 103 is usually connected to ground conductor 115. The other side of the output circuit of the bridge 103 is connected to ground conductor 115 via a filter capacitor C1.

A protection diode D11 is connected in reverse polarity across the field 24 to protect the contacts of breaker CB from the inductive current of the field in the event the breaker CB opens.

The voltage on field 24 is regulated by circuitry including an SCR1 which acts, in a way to be seen, to shunt out through a low impedance path selected half cycles of the output from secondary 105 of transformer T1 whereby the input to the bridge 103 is also shunted. Thus the anode of SCR1 is connected between the cathodes of a pair of diodes D12 and D13 via conductor 121. The anodes of diodes D12, D13 are each connected to an opposite end of the secondary 105 of transformer T1. The cathode of SCR1 is connected to ground conductor 115 via a current limiting resistor R1. A capacitor C2 shunts resistor R1 and assists in holding SCR1 'off' after each turn off. Note that diodes D12 and D13 act as a full wave device wherey each half cycle can be shunted for selected intervals. Shunting of the bridge 103 will reduce the field voltage and current and hence the ultimate magnitude of generated voltage. Diodes D12 and D13 isolate SCR1 and assist in preventing it from latching on. A capacitor C3 shunts the diodes D12 and D13 and acts as a transient filter.

The object of regulating the current to the field 24 is to maintain the output voltage at conductors 81, 83 at a preselected level e.g. 100–125 volts a-c, rms, to simulate normal utility voltages. Hence the magnitude of output voltage is sensed in a manner to be described, and appropriate trigger pulses are provided to the gate of SCR1. A transistent filter capacitor C4 is connected between gate and cathode of SCR1, while the main gate circuit includes a series circuit comprising a diode D14, a zener diode Z1 and a shunt resistor R2. The diode D14 provides back voltage protection for the gate while the breakdown voltage of zener Z1 in conjunction with the other circuit elements determines the gate voltage of SCR1.

The voltage to the gate circuit is provided by the output circuit of an n-p-n transistor Q1 which is connected as an emitter follower. Thus the emitter of Q1 is connected to the SCR1 gate circuit via resistor R2 and to ground conductor 115 via a load resistor R3.

The collector of Q1 is connected to a regulated d-c circuit 123 via a conductor 117. The regulated supply 123 is connected to the phase one leg 44 of alternator 12 via a conductor 119, a charge resistor R4 and a diode D15. The regulated supply 123 includes a capacitor C5 which has a charge path from leg 44 via resistor R4 to ground conductor 125. Diode D15 prevents discharge of C5 on negative half cycles at leg 44. The voltage level at C5 is held at the desired magnitude by the circuit of n-p-n transistor Q2 which has its emitter connected to ground conductor 125 and its collector connected to capacitor C5 via discharge resistor R5. The bias on Q2 is determined by resistors R6 and R7 serially connected across the emitter collector circuit of Q2 with the base of Q2 connected at their juncture. The transistor Q2 is biased to maintain the charge on capacitor C5 at a preselected magnitude and to provide a relatively short time discharge path when the potential at C5 exceeds that magnitude. Note that the regulated voltage at C5 and hence on conductor 117 is utilized elsewhere in the circuit and is taken off at connection point 9 in a manner to be described.

Conductor 119 is also connected to the field winding 24 via a diode D16 and light L via a conductor 124. This circuit permits the initial flow of charge current to the field winding 24 to assist in start up. Light L is used as a convenient resistance element.

The emitter-follower circuit of transistor Q1 responds to the input signal at its base to provide a similar output signal at its emitter. The input to the base of Q1 includes a rectifier circuit 112. The circuit 112 includes diodes D17-D20 which are connected as a symmetric rectifier with its input circuit connected between output conductors 81 and 83 and with its output circuit connected between conductor 114 and ground conductor 56 via ground conductor 115. A low pass filter circuit 116 includes equal resistors R8 and R9 which are connected at one of their ends to opposite sides of a capacitor C6. Resistor R8 has the same end connected to the juncture of diodes D17, D18 and its opposite end connected to output conductor 83 via conductor 118. Resistor R9 has its one end connected to the juncture of diodes D19, D20 and its opposite end to output conductor 81. Filter circuit 116 shunts out high frequency transients whereby a more uniform rectified output can be obtained.

Conductor 114 is connected to the base of Q1 via a circuit including resistors R10 and R11, which are connected together. A variable resistor R12 is connected from the juncture of resistors R10 and R11 to ground conductor 115 and defines with resistor R10 a voltage divider network such that the voltage at the base of Q1 can be set by the voltage across R12. A filter capacitor C7 is connected across R12 to further aid in filtering. A diode D21, connected from emitter to base of Q1, protects the emitter base circuit from reverse voltage breakdown. Thus a relatively clean pulsating d-c voltage will appear at conductor 114 and across R12 whereby the conduction of Q1 will be controlled. The voltage at the emitter of Q1 will follow that appearing at its base. When this voltage attains a magnitude to provide a voltage which exceeds the threshold voltage of zener Z1 a trigger pulse will result turning SCR1 "on" and substantially shorting the input to the field bridge circuit 103. This can occur an alternate half cycles as long as the output voltage across conductors 81 and 83 exceeds the desired magnitude. Thus regulation of the output potential is provided.

In order to prevent hunting and to provide stability to the circuit, a negative rate feed back circuit 120 is provided. A resistor R13 is serially connected to a capacitor C8 and defines therewith an integrating circuit which is connected between conductor 113 and ground conductor 115. Thus the potential on capacitor C8 will be an integration of the output field voltage at the output circuit of field bridge 103. Since hunting would result in fluctuating of field voltage, hunting can be inhibited by retarding the response time of SCR1 in accordance with the rate of change in field voltage. Thus a first differentiating circuit comprised of a capacitor C9 and serially connected resistor R14 is connected to capacitor C8 and will provide an output voltage in accordance with the rate of change of potential at C8. This will now provide a means of anticipating rapid changes in field voltage. The range of the circuit is extended by a second parallely connected differentiating circuit comprised of a capacitor C10 and serially connected resistor R15. The differentiating circuits also include a common resistor R16 connected from the juncture of resistor R14. R15 to ground conductor 115.

The output of the differentiating circuits is connected to the base of emitter-follower transistor Q1 via resistors R17 and R18. A diode D22 is connected from ground conductor 115 to the juncture of resistors R17 and R18 and operates to prevent the circuit from attaining a negative potential. The potential which is applied to the base of transistor Q1 is positive and will result in Q1 turning SCR1 on sooner, thereby retarding increases in field voltage and thereby inhibiting hunting. Note that the potential at the base of Q1 is further modified via a signal applied at point 3 from the ring current level detector circuit 38, which provides stability in a manner to be described.

FIG. 6 depicts the rotor 80 after it has rotated counterclockwise to a position just prior to inversion. Thus in FIG. 6 it can be seen that the $\phi_3$ potential will be the last to be interrupted as the circuit between brush 110 and conductive outer portions 99 or 101 is broken. At this time inverter brushes 102 and 104 are still in partial electrical contact with the inner portion 96 of common segment 87 and outer portion 90 of ground segment 84. This can be seen from FIG. 6 which depicts the position of the components just as brush 110 is about to be opened. At this time the inverter brushes 102 and 104 are beginning to engage insulating segments 92 and 94 but are still in electrical engagement with conductive portions 90 and 96. Thus the final switching of the phase three voltage and therefore of the voltage and current at output lines 81 and 83, will be made between the phase three brush 110 and its associated conductive ring portion 99 and 101.

Under resistive or high power factor loads the voltage and current will be substantially in phase and switching can occur with no difficulty since it is synchronized to occur at zero volts output. However, where medium to low power factor loads, i.e. mainly inductive, are encountered the current at zero voltage or at point of switching can be quite high. Switching this type of load can result in arcing and damage to the brush 110 and associated conductive portion. This problem is solved by the arc suppression circuit 34. Essentially the circuit 34 senses the initial reduction in load current as the circuit begins to open. Upon attainment of a preselected magnitude a solid state switching circuit is actuated to provide an alternate path around the brush 110. This circuit is maintained actuated until the phase brush 110 is opened and is deactuated before the circuits of inverter brushes 102 and 104 are opened. Note that inverter brushes 102, 104 will initiate contact for polarity inversion slightly before the phase one brush 106.

As noted the arc suppressor circuit 34 provides an alternate path for the current from the load 32 under the zero volt switching condition as the phase three resolver switch begins to open. This path is provided by the principal electrodes of an SCR2. As the phase three switching occurs to completely open the circuit from the resolver 18 to the load 32 the current begins to drop rapidly. If the opening of the switch continued the drop in current would be accompanied by an increase in voltage as a result of the inductive action of the load. This voltage at the phase three switch, i.e. brush 110 and segment portions 99 or 101 of common segment 87, could result in arcing. As will be seen the suppressor circuit 34 acts to provide the shunt path before the phase three switch has opened and hence before arcing can be initiated. Thus the suppressor circuit 34 includes a pulse transformer T3 which has its primary winding 128 connected in series with the full wave rectified output from bridge 16 at connection points 4 and 5 in the brush three line. Upon a sudden drop in current in the brush three line resulting from the initiation of switch opening, the current through primary 128 will drop sharply resulting in a pulse being induced in secondary winding 130. The secondary winding 130 is connected across the gate to cathode trigger circuit of SCR2. The latter circuit includes a coupling capacitor C12 and resistor R19 which are serially connected from one side of secondary 130 to the gate of SCR2. The opposite side of secondary 130 is connected to the cathode of SCR2 via conductor 132. A resistor R20 and serially connected diode D24 are connected across the secondary 130 and define with capacitor C12 a band pass filter to sharpen the pulse from secondary 130. In this regard a capacitor C13 is connected from conductor 132 to the juncture between capacitor C12 and resistor R19 and defines a low pass filter to shunt out high frequency signal components whereby the trigger pulse will be sharpened. A diode D25 is connected across capacitor C13 and provides a path for induced currents from pulse transformer T3 when the phase three switch opens interrupting the current through primary 128 via connection points 4 and 5. A capacitor C14 is connected to the cathode of SCR2 via conductor 132 and to its gate via a resistor R21. A diode D26 is connected from the juncture of resistor R26 and capacitor C14 to the anode of SCR2. The latter components define a hold off circuit which maintains SCR2 non conductive following commutation.

As noted, SCR2 has its cathode connected to conductor 132 but its anode is connected to ground via a system ground conductor 134. (It should be noted that the ground conductors referred to are a system ground and all conductors so designated are electrically connected together; however the noted system ground is isolated from any other ground, i.e. at the load 32, etc.) Each of the output conductors 81 or 83 is alternately connected to system ground via inverter 14 which has one switch side connected to ground conductor 56 (which by prior definition is electrically connected to ground conductor 115 and 134). The output conductors 81 and 83 are also connected to the cathode of SCR2 via diodes D27 and D28, respectively, and a primary winding 136 of a pulse transformer T4 and conductor 132. Diodes D27 and D28 have their anodes connected together and have their cathodes connected to the associated one of the output lines 81 and 83, respectively. Note that the voltage induced by the inductance of the load 32 in response to switching will reverse itself in polarity on alternate half cycles just as the current will reverse itself in polarity. Thus when conductor 83 was positive and 81 negative, a positive current from 83 to 81 will occur and this current flow will attempt to continue as the voltage between 83 and 81 begins to approach zero. As the current drops in magnitude when the phase three switch begins to open the inductance at the load 32 will induce a positive voltage at conductor 81 relative to 83. Conductor 81, however, is at that time connected to the system ground via inverter 14 and conductor 56 and hence a positive potential will be applied to the anode of SCR2 via conductor 134. At the same time output conductor 83 is connected to the cathode of SCR2 via diode D28 whereby a shunt path around the phase three switch will be completed. On the alternate half cycles the polarity of 81 and 83 will be reversed and inverter switch 14 will be in its alternate position such that the now positive conductor 83 will be connected to system ground and the anode of SCR2 and the negative conductor 81 will be connected to the cathode of SCR2 via diode D27. Note that the current through the primary 128 of pulse transformer T3 will be unidirectional since it is taken at contact points 4 and 5 and hence would be a pulsating direct current. The pulse transformer T3 and associated trigger circuit for SCR2 will not provide a trigger pulse for normal current decay but will respond to the rapid current decrease which occurs as the phase three switch is being opened.

SCR2 can be triggered into conduction on each half cycle and will initiate conduction before the phase three switch has completely opened the circuit. As noted, the inverter brushes 102 and 104 are still conducting and have not yet completely opened, i.e. have not completely moved onto insulating segments 92 and 94. In fact the shunt path around the phase three switch utilizes the circuit through the inverter brushes 102 and 104 for the path to the system ground. It is important then that the SCR2 rendered non-conductive to open the shunt circuit before the inverter brushes 102 and 104 completely open via engagement with the associated insulating segments 92 and 94 or arcing will occur. Thus the turnoff of the SCR2 circuit is controlled to occur prior to the circuit of the inverter brushes 102 and 104 opening.

SCR2 is turned off or commutated by SCR3 which has its cathode connected to the cathode of SCR2 via a resistor R22 and conductor 132. SCR3 has its anode connected to a commutation capacitor C15 via an inductance coil L1. C15 has one side connected to ground. When SCR3 is rendered conductive it will apply at conductor 132 and at the cathode of SCR2 a positive voltage which exceeds that at the SCR2 cathode and hence will bias SCR2 into non-conduction. The voltage for the principal electrodes of SCR3 is provided by the charge placed on capacitor C15. C15 is charged from a full wave rectifier bridge 136 which is comprised of diodes D29-D32 conventionally connected in the bridge configuration. One leg of bridge 136 is connected to the rectified output of the phase three leg at diode D6 via conductor 142 such that positive charge current can flow to capacitor C15. The voltage is boosted via the booster transformer 72. Thus the input circuit for bridge 136 is energized from secondary winding 138 of the booster transformer T2 which has its primary winding 140 connected to the third phase leg winding 48 via connection point one and via primary 102 of current transformer T1 to connection point 2. The booster transformer T2 is utilized in conjunction with the charge current from the phase three leg via conductor 142 to assure the attainment of a potential charge on C15 adequate to commutate SCR2 off when SCR3 conducts.

The rectified output from rectifier circuit 136 is connected to the capacitor C15 and inductance L1 via a diode D33 and charge resistor R28. Diode D33 provides back voltage protection for the rectifier circuit 136.

SCR3 is turned on by a trigger pulse applied to its gate circuit via a unijunction transistor UJ1. The triggering of UJ1 in turn is timed to provide a preselected delay from the time that SCR2 starts conducting in order to permit the phase brush 110 to have completed its switching operation. In other words the shunt circuit provided by SCR2 in conduction is maintained until phase three brush 110 has switched. Note that at this time the shunt circuit includes inverter brushes 102 and 104. The shunt circuit must be opened before inverter brushes 102 and 104 open so that their opening can also be under a no load condition. The timing of the shunt circuit provides the proper sequence whereby the ultimate breaking of the load circuit is provided via SCR2. Thus establishment of the shunt circuit permits the resolver brush 110 to be opened under low or no load and the subsequent opening of the shunt circuit permits opening of the inverter circuit via brushes 102 and 104 under no load. Note that the maintenance of a circuit through inverter brushes 102, 104 until resolver brush 110 opens can be provided by providing brushes 102, 104 to be wider than brush 110. In one form of the invention a delay of 100 usec. was provided.

Initiation of timing is provided by pulse transformer T4, the primary winding 136 of which is connected in the free wheel circuit or shunt path provided by SCR2. T4 has a secondary winding 144 which provides pulses in response to initiation of conduction through the primary 136. A diode D34 is connected across secondary 144 to provide a reverse voltage path. One side of secondary 144 is connected to the emitter of UJ1 via a charge capacitor C16 while the other side is connected to one base of UJ1 via diode D35 and resistor R29. A charge resistor R30 is connected from the emitter of UJ1 to the juncture D35 and R29 and is a part of the charge circuit for capacitor C16. A zener diode Z2 is connected across the circuit charge storage capacitor C17a which maintains voltage for charge to C16. Zener Z2 will insure a relatively uniform voltage across C17a and hence at R30 and C16, the voltage across Z2 and hence charge of C17a will rise quickly to the regulated level because of the action of pulse transformer T4. The resistor R30 and capacitor C16 have a selected RC time constant whereby the potential at the emitter of UJ1 as provided by capacitor C16 will reach the firing point at a preselected time after initiation of free wheel or shunt current through T4. Z2 assures that the bias on UJ1 will be uniformly maintained such that firing will occur at the same potential at capacitor C16 and hence at the same elapsed time from shunting.

The other base of UJ1 is connected to the gate of SCR3 via a dropping resistor R31 while a return path to capacitor C16 is provided via a conductor 146 from the cathode of SCR3. Note that it is the charge on capacitor C16 that turns SCR3 on via UJ1.

With SCR3 now turned on capacitor C15 will provide the positive potential needed to turn SCR2 off and the free wheel path through SCR2 will be opened. When the current from C15 diminishes, inductor 21 will induce a voltage of reverse polarity which will commutate SCR3 off. This will return the suppressor to its original state in preparation for the next switching operation.

In order to assure that SCR3 will be held off and not rendered conductive by additional pulses from UJ1 via C16, a hold off circuit is provided. Thus a capacitor C17 is connected across the resistor R22 via a diode D35. C17 will be charged when SCR3 is rendered conductive. The charge of capacitor C17 is coupled to the gate of SCR3 via resistor R32. The charge on capacitor C17 will reverse bias the gate of SCR3. This reverse bias will appear only after UJ1 has triggered SCR3 into conduction and will assist in keeping SCR3 from being turned on again by repeat pulses from UJ1 and at the same time will improve the turn-off time characteristic of SCR3 in opening against the high free wheeling or shunt voltage impressed thereon when the L1 and C15 circuit rings.

Thus with the circuitry previously described arcing of the resolver and inverter switches is inhibited.

There are some extreme load conditions under which the suppressor circuit 34 could be subjected to currents of excessive magnitude. In the latter case arcing could occur at the inverter brushes. This can occur when there are sharp voltage and current spikes. These spikes usually build up over a series of cycles and do not necessarily occur instantly. The occurrence of such high voltage and current peaks is indicative of an improper load being applied to the alternator 12 and hence the alternator should be shut down. This is done by the ring current level detector circuit 38.

A relatively high capacity capacitor C18 is connected across the load 32. Capacitor C18 provides a path for dumping the inductive current after shunting has been terminated, i.e. SCR2 turned off. It is the rate of rise in voltage across C18 that is sensed to determine an incipient high ring current condition. Thus a differentiating circuit 148 comprising a parallel circuit of a capacitor C19 and resistor R30 is connected to the anodes of diodes D27 and D28 via a dropping resistor R31 and to a system ground conductor 150 via resistor R32. Thus the rate of change of the voltage across C18 will be sensed by differentiating circuit 148 and will be higher at steep voltage rises at C18 and will provide an indication of the magnitude of the ring current.

The differentiated voltage is coupled to a sample and hold circuit 151 via a coupling capacitor C20 and diode D37; a diode D38 is connected across C20 and R32 and a sample and hold capacitor C21 is connected from diode D37 to ground. Capacitor C21 will attain a charge having a magnitude which is a function of the peak rate of change of voltage on C18 as provided by differentiating circuit 148 and hence the faster the rise time of the voltage at C18 the greater the charge on capacitor C21. C21 is connected to the input of a pair of n-p-n transistors Q2 and Q3 which form a Darlington amplifier which is connected as an emitter follower. Thus capacitor C21 is connected to the base of Q2 while its emitter is connected to the base of Q3. Q3 has its emitter connected to ground via a load resistor R33. The collectors of Q2 and Q3 are connected together and are in turn connected to the regulated supply 123 in field regulator circuit 36 at connection point 9. The emitter follower circuit defined by Q2 and Q3 provides a high input impedance for capacitor C21 whereby its charge can be maintained. Thus as on successive cycles the voltage across C18 increases and will result in an increased output from Q3 across load resistor R33.

The potential at the emitter of Q3 then is applied to a base of a unijunction UJ2 via a time delay or integrating circuit 152. Circuit 152 includes a filter capacitor C23 connected from Q3 emitter to ground conductor 150, a resistor R34 connected from Q3 emitter to the base of UJ2 and a capacitor C24 connected from that base to ground conductor 150.

The time delay circuit 152 prevents triggering of UJ2 for a selected time period, i.e. 15 to 20 cycles of the 60 cycle output, such that shut down does not occur in response to normal motor starting and/or spurious, short time transients. UJ2 has its second base connected to the movable arm 154 of a potentiometer R36 which has one end connected to ground conductor 150 and its other end connected to resistor R38 and thence to the regulated supply 123 via conductor 156 and connecting point 9. The potential across R36 is further regulated by a zener diode Z3 connected thereacross. The potential at arm 154 as applied to the second base of UJ2 establishes the set point for firing. The emitter of UJ2 is connected to a control circuit 158 (FIG. 3A) via diode D40 and conductor 160. Diode D40 provides reverse voltage protection for UJ2.

As previously noted, shut down in response to detection of high level voltages occurs by actuating the thermal breaker CB. This is accomplished by the control circuit 158. An SCR4 has its gate connected to the output of UJ2 via conductor 160. A resistor R39 and capacitor C25 (FIG. 3B) are connected from conductor 160 to ground and filter out noise etc., to inhibit false firing. The anode of SCR4 is connected across output conductors 81 and 83 via oppositely connected diodes D41 and D42, respectively. The cathode of SCR4 is connected to system ground conductor 115 via a low impedance resistor R40, conductor 162 and thermal breaker CB. A diode D44 is connected from SCR4 cathode to capacitor C26. A resistor R41 provides gate drive via the charge on capacitor C26 to hold SCR4 on until CB has opened to shut down the alternator 12. Now in the event of a series of rising voltages at the output, indicative of an excessive ring current condition, UJ2 will be triggered whereby the gate circuit of SCR4 will be actuated rendering SCR4 conductive. The circuit of SCR4 will now provide a low impedance path from the output to the thermal breaker CB whereby the excessive current will actuate the breaker CB resulting in its opening and deactuating the field circuit; this in turn will shut the alternator 12 down whereby no voltage will be generated. Note that the thermal breaker CB must be manually reset. Thus protection from improper loading is provided by the level detector circuit 38.

In addition to the above it is possible to have a fault occur in the load which is of a nature that excessive voltage spikes could be generated but the resultant width, frequency or polarity of the high voltage spikes would not be sufficient to actuate the ring current level detector circuit 38. The latter condition is provided for by the thermal level detector circuit 40. It should be noted that the voltage spikes referred to are not a result of ringing after commutation but are strictly load induced.

The thermal level detector circuit 40 operates in conjunction with the gate circuit of SCR4 of the control circuit 158. A metal oxide varistor, MOV, is connected across the load 32 and hence across output conductors 81 and 83 and in the event of voltage spikes at the load 32 will experience a thermal rise. Note that the MOV will be actuated, i.e. provide bipolar breakdown condition, in response to voltage spikes normally in excess of that experienced during commutation ringing. A positive temperature coefficient resistor PTC is physically secured to the MOV in order to respond to the temperature thereof. The PTC has a resistance characteristic which is low and constant until a predetermined higher temperature is attained at which time the resistance rises abruptly. Thus the PTC will undergo a quick increase in temperature upon the MOV generating sufficient heat in response to a load fault condition.

The PTC is connected at one side to system ground conductor 150 and at its other side to the regulated supply 123 via resistor R42 and conductor 157. A diode D45 is connected from the juncture of R42 and PTC to the gate of SCR4 via conductor 160. R42 and PTC define a voltage divider network and when PTC is in its normal low impedance condition the potential at diode D45 and hence at the gate of SCR4 is low and hence SCR4 cannot be triggered "on". When PTC is actuated in response to elevated temperatures at MOV to its higher resistive state, the potential at D45 rises to a level sufficient to trigger the gate of SCR4. Thus SCR4 will be rendered conductive and actuate thermal breaker CB to open the field 24 and shut down the alternator 12 in the manner previously discussed. Thus the thermal level detector 40 provides protection from overload resulting from load faults.

It should be noted that the alternator 12 will be shut down by the thermal breaker CB when the field current exceeds its rated capacity for a selected time and hence CB will provide additional overload protection as when the output current of alternator 12 is excessive i.e. short circuit, improper load, etc.

A rate capacitor C22 is connected from the emitter of Q3 in the sample and hold circuit 151 to the base of Q1 in the regulator circuit 36; hence the rate of change in current signal at Q3 will be applied to the regulator circuit 36. With induction motors and for synchronous motors there is a tendency with synthesized wave forms under certain motor load conditions for the motor to overrun. Overrun can produce instability in the regulator circuit 36 and also will result in undesirable motor hunting. As the motor overruns it appears more inductive, i.e. power factor decreases, resulting in an increase in ring current. This current is sensed by the ring current level detector 38 at levels below that which would result in shut down of alternator 12. The magnitude of ring current and hence inductance and hence magnitude of overrun will appear as a potential at the emitter of Q3 and will be fed back to the base of Q1 in regulator circuit 36 via capacitor C22. An increase in voltage at the base of Q1 will speed its time of conduction and hence the firing of SCR1 whereby the field current will be decreased. The decrease in field current will tend to counter the overrun and stabilize the speed of the induction motor.

Note that what is sensed here is the rate of charge of the inductive current in ringing as an indication of incipient overrun.

Note that what is provided is selective switching in the rectifier circuit whereby the rectification is varied to provide pulse width modulation. In this regard it should be understood that actual full wave rectification occurs only when all three controlled condition devices are conductive, i.e. as when the eight peak wave is produced. Hence in the present invention modulation is not performed after rectification, i.e. on the output of a fully rectified wave, but rather during rectification whereby the degree of full phase rectification is varied.

An objective here is to provide a wave which simulates a sinusoidal wave and this is done by selecting the number of phases rectified at any one time. It should be understood that the width of pulses to comprise the output could be selectively varied depending upon the frequencies involved, etc.

It is significant, however, and has been found advantageous to perform switching at both of the controlled conduction devices and of the inverter at zero volts. The output voltage is shown to be of a constant amplitude. Actually the amplitude can vary depending upon the nature of the load, the impedance of the alternator 12 regulation, etc. Where reference is made to an output voltage having a constant voltage waveform what is meant is that the sine wave simulation is provided by the pulse width modulation and not by variation of voltage amplitudes.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. An energy conversion system for converting a high frequency alternating output potential from an alternator to a single phase, low frequency, alternating output for a load, including rectifying means connected to the output from the alternator to produce a unidirectional output, means connected with said rectifying means for controlling said rectifying means to provide a plurality of unidirectional waves, inverter means for inverting alternate ones of said waves whereby an alternating output wave is provided, arc suppressor circuit means connected to the load for providing a low impedance shunt path around said rectifying means and said inverter means at a preselected time after each of said unidirectional waves, and spike detector means connected to the load and responsive to a condition indicative of an excessive voltage condition for disabling the alternator, said spike detector means comprising a breakdown device connected across the load and having a bipolar breakdown characteristic for breaking down in response to potentials of a preselected high magnitude, a positive temperature coefficient resistor having a sharp resistance rise characteristic being physically connected to said breakdown device and responding to the temperature rise of said breakdown device during breakdown for providing a sharp change in resistance and actuating means responsive to said sharp change in resistance for opening said field and shutting down said alternator.

2. The system as set forth in claim 1 including a thermally actuated breaker in the circuit of said field for opening that circuit in response to a predetermined high field current, said actuating means applying a current to said breaker in recess of said high field current in response to said sharp change in resistance wherein the circuit of said field is opened.

3. An energy conversion system for converting a high frequency alternating output potential from an alternator to a single phase, low frequency, alternating output for a load, including rectifying means connected to the output from the alternator to produce a unidirectional output, means connected with said rectifying means for controlling said rectifying means to provide a plurality of unidirectional waves, inverter means for inverting alternate ones of said waves whereby an alternating output wave is provided, and arc suppressor circuit means connected to the load for providing a low impedance shunt path around said rectifying means and said inverter means at a preselected time after each of said unidirectional waves, said arc suppressor circuit means comprising a first controlled conduction device having first principal electrodes and a first control electrode actuable to render said first principal electrodes conductive in response to a first trigger signal, said first principal electrodes located in said shunt path, whereby said shunt path is closed when said first principal electrodes are conductive and opened when said first principal electrodes are nonconductive, sensing means sensing the magnitude of current through said brush and slip ring assembly for providing said first trigger signal as the magnitude of current through said brush and slip ring assembly drops whereby said first principal electrodes are rendered conductive and said shunt path is closed.

4. The system of claim 3 with said arc suppressor means comprising commutation means actuable to a commutation state for rendering said first principal electrodes nonconductive, said commutation means comprising timing means for delaying said commutation means a preselected duration after said first principal electrodes are rendered conductive.

5. The system of claim 4 with said commutation means comprising a second controlled conduction device having second principal electrodes and a second control electrode rendering said second principal electrodes conductive in response to a second trigger signal, first circuit means connecting said first and second principal electrodes wherein said first principal electrodes are rendered nonconductive in response to said second principal electrodes being rendered conductive, and said timing means is connected to said second control electrode for providing said second trigger signal to said second control electrode whereby said second principal electrodes are rendered conductive after said preselected duration.

6. The system of claim 5 with said commutation means further comprising a capacitor and including charge circuit means for charging said capacitor to a charge of a predetermined magnitude at which said second controlled conduction device is nonconductive and discharge circuit means that includes said second principal electrodes wherein said charge on said capacitor will be applied to said first principal electrodes rendering said first principal electrodes nonconductive.

7. The system of claim 6 including a capacitor connected across the load and sensing means for sensing the magnitude of ring current through said capacitor.

8. The system of claim 7 with said sensing means comprising differentiating circuit means for differentiating the voltage across said capacitor and providing a signal having a magnitude being an indication of the magnitude of ring current.

9. The system of claim 8 including a thermally actuated breaker in said field actuable in response to field current of a predetermined magnitude for opening the field, and actuating means operable in response to said signal attaining a magnitude indicative of the ring current attaining said preselected magnitude for applying a current to said breaker of said predetermined magnitude wherein said field is opened.

10. In an energy conversion system for converting a three phase, high frequency alternating output potential from an alternator to a single phase, low frequency alternating output for a load, the improvement comprising: rectifying means connected to the output of the alternator for providing a rectified output through each phase, resolver means connected to said rectifying means and controlling said rectifying means for providing a pulse width modulated rectified output defined by continuously repetitive unidirectional pulses having similar wave shapes, said resolver means comprising three resolver switches, with one of said resolver switches being operable with said rectified output for each phase, said resolver switches being operable on said rectified output to provide a modified rectified output and being actuable to closed and open positions in a preselected sequence, a first of said switches being actuated closed prior to the remaining two for transmitting said rectified output for the first phase, a second of said switches being actuated closed approximately 30° after said first switch, for transmitting said rectified output for the second phase, and a third of said switches being actuated closed approximately 60° after said first switch for transmitting said rectified output for the third phase, each of said switches being closed for approximately 90° whereby said first switch opens with said second and third switches closed, said second switch opens with said third closed, and said third switch opens with said first and second opened, each of said unidirectional pulses comprising the composite output from said resolver switches for a period including when said first switch was actuated closed to when said third switch was actuated open, inverter means connected to said resolver means for receiving said modified rectified output and for inverting alternate ones of said unidirectional waves whereby an alternating voltage output is provided, said inverting means comprising an inverter switch operable for inverting the polarity of alternate ones of said unidirectional waves, each of said resolver switches comprising a brush and resolver ring structure, said inverter switch comprising three brushes and an inverter ring structure, said resolver ring structure and said inverter ring structure being located on a common rotor and said resolver switches and said inverter switch being located on a common stator, reducer means connecting said common rotor with the alternator whereby said rotor is rotated at a preselected speed less than the alternator speed such that the frequency of the resultant alternating output from said inverting means is 60 Hz, said resolver ring structure comprising a pair of diametrically opposed resolver insulating portions extending circumferentially for apporoximately 90° and being spaced apart by a pair of diametrically opposed resolver conductive portions with each said resolver brush adapted to engage said resolver insulating and conductive portions, each said resolver brush being located 30° electrically from an adjacent said resolver brush, said inverter ring structure comprising a 360° continuous conductive portion electrically connected to a first less than 180° conductive portion and a second less than 180° conductive portion circumferentially in line with and extending equally circumferentially with said first conductive portion, a pair of inverter insulating portions located between said first and second conductive portions and extending circumferentially slightly greater than the width of associated ones of said inverter brushes whereby said first and secoond conductive portions extend circumferentially substantially further than said inverter insulating portions, two of said inverter brushes spaced 180° apart for sequential engagement with said first and second conductive portions and said inverter insulating portions and a third of said inverter brushes located for engagement with said 360° continuous conductive portions, said second less than 180° conductive portion being electrically connected with said resolver conductive portions, said brush for said third resolver switch adapted to engage said resolver insulating portions and open the circuit therethrough prior to said two of said inverter brushes engaging said inverter insulating portions and opening the circuit therethrough, are suppressor circuit means connected to the load for providing a low impedance shunt path around said resolver means prior to said third resolver switch opening and opening said shunt path prior to said inverter switch opening, said suppressor circuit means comprising a first unidirectional solid state controlled conductive device having a first principal circuit and a first gate circuit with said first principal circuit being rendered conductive in response to a first gate signal at said first gate circuit, first sensing means for sensing a change in current through said third resolver switch indicative of an incipient open condition for providing said gate signal whereby said first principal circuit is rendered conductive closing said shunt path, timing means responsive to said first principal circuit being closed for providing a second signal a preselected time interval after said first principal circuit is closed, commutating means connected to said first principal circuit for rendering said first principal circuit non-conductive in response to said second signal, said preselected time interval being of a selected duration terminating prior to two of said inverter brushes opening the circuit therethrough whereby said shunt path is opened prior to said two of said inverter brushes opening, ring current level detection means electrically connected to the load and responsive to a voltage having a preselected rate of rise for disabling the alternator, said ring current level detection means comprising time delay means for delaying the disabling for a preselected time greater than the time for one cycle, and spike detector means connected to the load and responsive to a condition indicative of an excessive voltage condition for disabling the alternator, and regulating means for regulating the alternator whereby said modulated rectified output is regulated.

11. In an energy conversion system for converting a multiphase, high frequency alternating output potential from an alternator to a single phase, low frequency alternating output for a load, with the output of the alternator being controlled via a controllable field and with the load being an induction motor or the like, the improvement comprising: controlled rectifying means connected to the output of the alternator for providing a rectified output through each phase in a timed sequence for providing a pulse width modulated rectified output defined by continuously repetitive unidirectional pulses having similar wave shapes, inverter means connected to said controlled rectifying means for receiving said modulated rectified output and for inverting alternate ones of said unidirectional waves whereby an alternating voltage output is provided, regulating means operable for regulating the field of the alternator whereby said modulated rectified output is regulated, said regulating means comprising sensing means for sensing the rate of change in inductive ring current from the load and for reducing the field in response to higher rates of charge whereby overrun of the induction motor is inhibited.

12. In an energy conversion system for converting a multiphase, high frequency alternating output potential from an alternator to a single phase, low frequency alternating output for a load, the improvement comprising: controlled rectifying means connected to the output of the alternator for providing a rectified output through each phase in a timed sequence for providing a pulse width modulated rectified output defined by continuously repetitive unidirectional pulses having similar wave shapes, inverter means connected to said controlled rectifying means for receiving said modulated rectified output and for inverting alternate ones of said unidirectional waves whereby an alternating voltage output is provided, arc suppressor circuit means connected to the load for providing a low impedance shunt path around said controlled rectifying means and said inverter means at a preselected time after each of said unidirectional pulses.

13. The apparatus of claim 12 with said arc suppressor circuit means opening said shunt path prior to said inverter means being actuated to invert the next one of said unidirectional pulses.

14. In an energy conversion system for converting a multiphase, high frequency alternating output potential from an alternator to a single phase, low frequency alternating output for a load, the improvement comprising: controlled rectifying means connected to the output of the alternator for providing a rectified output through each phase in a timed sequence for providing a pulse width modulated rectified output defined by continuously repetitive unidirectional pulses having similar wave shapes, inverter means connected to said controlled rectifying means for receiving said modulated rectified output and for inverting alternate ones of said unidirectional waves whereby an alternating voltage output is provided, ring current detection means electrically connected to the load and responsive to a ring voltage having a preselected rate of rise for disabling the alternator.

15. The apparatus of claim 14 with the alternator having a field and with said ring current detection means disabling the alternator by disabling the field.

16. In an energy conversion system for converting a multiphase, high frequency alternating output potential from an alternator to a single phase, low frequency alternating output for a load, the improvement comprising: controlled rectifying means connected to the output of the alternator for providing a rectified output through each phase in a timed sequence for providing a pulse width modulated rectified output defined by continuously repetitive unidirectional pulses having similar wave shapes, inverter means connected to said controlled rectifying means for receiving said modulated rectified output and for inverting alternate ones of said unidirectional waves whereby an alternating voltage output is provided, and spike detector means connected to the load and responsive to a condition indicative of an excessive voltage condition for disabling the alternator.

17. The apparatus of claim 16 with the alternator having a field and with said spike detector means disabling the alternator by disabling the field.

18. An energy conversion system for converting multiphase, high frequency energy to single phase, low frequency energy, and providing the single phase energy to a load, the improvement comprising an alternating current alternator for generating the alternating current multiphase energy at a selected high frequency, rectifying means connected to the output from said alternator to produce a unidirectional output from said rectifying means control switch means connected with said rectifying means for controlling said rectifying means to provide a plurality of pulse width modulated unidirectional waves having a preselected frequency less than said selected high frequency, and inverter means for inverting alternate ones of said modulated waves whereby an alternating output wave is provided, one of said control switch means and said inverter means comprising circuit switch means for opening the circuit to the load and including a brush and slip ring assembly operable at least at some time to provide an open circuit between the said rectifying means and load, and arc suppressor circuit means for providing a low impedance shunt path around said switch means prior to said switch means providing said open circuit whereby arcing of said brush and slip ring is inhibited.

19. The system of claim 18 with said arc suppressor means comprising a first controlled conduction device having first principal electrodes and a first control electrodes actuable to render said first principal electrodes conductive in response to a first trigger signal, said first principal electrodes located in said shunt path, whereby said shunt path is closed when said first principal electrodes are conductive and opened when said first principal electrodes are nonconductive, sensing means sensing the magnitude of current through said brush and slip ring assembly for providing said first trigger signal as the magnitude of current through said brush and slip ring assembly drops whereby said first principal electrodes are rendered conductive and said shunt path is closed.

20. The system of claim 19 with said arc suppressor means comprising commutation means actuable to a commutation state for rendering said first principal electrodes nonconductive, said commutation means comprising timing means for placing said commutation means a preselected duration after said first principal electrodes are rendered conductive.

21. The system of claim 20 with said commutation means comprising a second controlled conduction device having second principal electrodes and a second control electrode rendering said second principal electrodes conductive in response to a second trigger signal, first circuit means connecting said first and second principal electrodes wherein said first principal electrodes being rendered nonconductive in response to said second principal electrodes being rendered conductive, said timing means connected to said second control electrode for providing said second trigger signal to said second control electrode whereby said second principal electrodes are rendered conductive after said preselected duration.

22. The system of claim 21 with said commutation means further comprising a capacitor and including charge circuit means for charging said capacitor to a charge of a predetermined magnitude which said second controlled conduction device is nonconductive and discharge circuit means includes said second principal electrodes wherein said charge on said capacitor will be applied to said first principal electrodes rendering said first principal electrodes nonconductive.

23. The system of claim 22 with said discharge circuit means including an inductor operable for rendering said second principal electrodes nonconductive after said capacitor discharge.

24. An energy conversion system for converting multiphase, high frequency energy to single phase, low frequency energy, and providing the single phase energy to a load, the improvement comprising an alternating current alternator for generating the alternating current multiphase energy at a selected high frequency said alternator having a field, rectifying means connected to the output from said alternator to produce a unidirectional output from said rectifying means, control switch means connected with said rectifying means for controlling said rectifying means to provide a plurality of pulse width modulated unidirectional waves having a preselected frequency less than said selected high frequency, and inverter means for inverting alternate ones of said modulated waves whereby an alternating output wave is provided, and ring current level detector circuit means for interrupting said field and shutting said generator down in response to the ring current from the load attaining a preselected magnitude.

25. The system of claim 24 including a capacitor connected across the load and sensing means for sensing the magnitude of ring current through said capacitor.

26. The system of claim 25 with said sensing means comprising differentiating circuit means for differentiating the voltage across said capacitor and providing a signal having a magnitude being an indication of the magnitude of ring current.

27. The system of claim 26 including a thermally actuated breaker in said field actuable in response to field current of a predetermined magnitude for opening up the field, and actuating means operable in response to said signal attaining a magnitude indicative of the ring current attaining said preselected magnitude for applying a current to said breaker of said predetermined magnitude wherein said field is opened up.

28. An energy conversion system for converting multiphase, high frequency energy to single phase, low frequency energy, and providing the single phase energy to a load, the improvement comprising an alternating current alternator for generating the alternating current multiphase energy at a selected high frequency said alternator having a field, rectifying means connected to the output from said alternator to produce a unidirectional output from said rectifying means control switch means connected with said rectifying means for controlling said rectifying means to provide a plurality of pulse width modulated unidirectional waves having a preselected frequency less than said selected high frequency, and inverter means for inverting alternate ones of said modulated waves whereby an alternating output wave is provided, one of said control switch means and said inverter means comprising circuit switch means for opening the circuit to the load, and spike detector means for detecting voltage across the load and for opening the circuit to said field in response to voltage spikes of a preselected magnitude for shutting said alternator down.

29. The system of claim 28 with said spike detector means comprising a breakdown device connected across the load and having a bipolar breakdown characteristic for breaking down in response to potentials of a preselected high magnitude, a positive temperature coefficient resistor having a sharp resistance rise characteristic being physically connected to said breakdown device and responding to the temperature rise of said breakdown device during breakdown for providing a sharp change in resistance and actuating means responsive to said sharp change in resistance for opening said field and shutting down said alternator.

30. The system of claim 29 including a thermally actuated breaker in the circuit of said field for opening up that circuit in response to a predetermined high field current, said actuating means applying a current to said breaker in excess of said high field current in response to said sharp change in resistance wherein the circuit of said field is opened.

31. An energy conversion system for converting multiphase, high frequency energy to single phase, low frequency energy, and providing the single phase energy to an inductance motor load or the like, the improvement comprising an alternating current alternator for generating the alternating current multiphase energy at a selected high frequency, said alternator including a field, rectifying means connected to the output from said alternator to produce a unidirectional output from said rectifying means, control switch means connected with said rectifying means for controlling said rectifying means to provide a plurality of pulse width modulated unidirectional waves having a preselected frequency less than said selected high frequency, and inverter means for inverting alternate ones of said modulated waves whereby an alternating output wave is provided, one of said control switch means and said inverter means comprising circuit switch means for opening the circuit to the load, field regulator means connected to said field for regulating the voltage applied to said field, and means responsive to the rate of change of current in the inductive ring across said load for varying the field wherein conversion of the inductive motor is inhibited.

* * * * *